US011086081B2

(12) United States Patent
Watts

(10) Patent No.: US 11,086,081 B2
(45) Date of Patent: Aug. 10, 2021

(54) CONDUCTIVE COOLING FOR SMALL FORM-FACTOR PLUGGABLE (SFP) FIBER OPTIC TRANSCEIVERS

(71) Applicant: Schweitzer Engineering Laboratories, Inc., Pullman, WA (US)

(72) Inventor: Steven Watts, Boise, ID (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 0 days.

(21) Appl. No.: 16/360,296

(22) Filed: Mar. 21, 2019

(65) Prior Publication Data
US 2020/0301076 A1 Sep. 24, 2020

(51) Int. Cl.
G02B 6/38 (2006.01)
G02B 6/42 (2006.01)

(52) U.S. Cl.
CPC ......... G02B 6/3814 (2013.01); G02B 6/4269 (2013.01)

(58) Field of Classification Search
CPC .................. G02B 6/4269; G02B 6/3814
See application file for complete search history.

(56) References Cited

U.S. PATENT DOCUMENTS

| 3,532,158 | A | 10/1970 | Hiebert |
| 5,752,011 | A | 5/1998 | Thomas |
| 5,767,999 | A | 6/1998 | Kayner |
| 6,667,883 | B1 | 12/2003 | Solis |
| 6,804,116 | B2 | 10/2004 | Owens |
| 6,822,860 | B2 | 11/2004 | Owens |
| 7,111,465 | B2 | 9/2006 | Bell |
| 7,313,500 | B2 | 12/2007 | Morman |
| 7,723,760 | B2 | 5/2010 | Henderson |
| 8,879,262 | B2 * | 11/2014 | Shi .......................... G02B 6/428 361/704 |
| 10,389,397 | B2 * | 8/2019 | Edgren ............... H05K 5/0247 |
| 2002/0009905 | A1 | 1/2002 | Poplawski |
| 2003/0161108 | A1 | 8/2003 | Bright |
| 2004/0047564 | A1 | 3/2004 | Chiu |
| 2006/0037589 | A1 | 2/2006 | Gupta |
| 2007/0033425 | A1 | 2/2007 | Clark |

(Continued)

FOREIGN PATENT DOCUMENTS

| CN | 102164074 | 8/2011 |
| WO | 2006069173 | 4/2009 |

OTHER PUBLICATIONS

PCT/US2013/042935 Patent Cooperation Treaty, International Search Report and Written Opinion of the International Searching Authority, dated Aug. 2, 2013.

(Continued)

Primary Examiner — Eric Wong
(74) Attorney, Agent, or Firm — Bradley W. Schield

(57) ABSTRACT

The present disclosure relates to conductive cooling of a small form-factor pluggable (SFP) transceiver. For example, an SFP transceiver assembly may include a cooling block and a thermally conductive pad having a thermally conductive material. The SFP transceiver assembly may include a spring finger that contacts the thermally conductive pad while the SFP transceiver is inserted into the SFP transceiver assembly to allow heat to be conducted from the SFP transceiver to the cooling block via the thermally conductive pad to conductively cool the SFP transceiver.

16 Claims, 6 Drawing Sheets

(56) References Cited

U.S. PATENT DOCUMENTS

| | | | |
|---|---|---|---|
| 2007/0193872 A1 | 8/2007 | Garcia | |
| 2007/0253168 A1* | 11/2007 | Miller | H01R 13/7172 |
| | | | 361/719 |
| 2008/0056647 A1* | 3/2008 | Margolin | G02B 6/4256 |
| | | | 385/89 |
| 2009/0279218 A1 | 11/2009 | Ferru | |
| 2010/0091747 A1 | 4/2010 | Dorsey | |
| 2010/0155033 A1 | 6/2010 | Holley | |
| 2012/0058670 A1 | 3/2012 | Regnier | |
| 2013/0000871 A1 | 1/2013 | Olson | |
| 2017/0168253 A1* | 6/2017 | Wilcox | G02B 6/4277 |
| 2019/0044299 A1* | 2/2019 | Kazav | H05K 7/20163 |
| 2019/0113698 A1* | 4/2019 | Huang | G02B 6/4246 |
| 2019/0379417 A1* | 12/2019 | English | G02B 6/4269 |
| 2020/0153163 A1* | 5/2020 | Guetig | H01R 13/6582 |
| 2020/0288589 A1* | 9/2020 | Lavoie | H05K 7/20418 |

OTHER PUBLICATIONS

V.G. Pastukhov, Yu.F. Maidanik, C.V. Vershinin, M.A. Korukov, Minature Loop Heat Pipes for Electronics Cooling, Dec. 27, 2002.

Banjerd Saengchandr, Nitin V. Afzulpurkar, A Novel Approach for Cooling Electronics Using a Combined Heat Pipe and Thermoelectric Module, 2009.

Gajanana C. Birur, Michael T. Pauken, Keith S. Novak, Thermal Control of Mars Rovers and Landers Using Mini Loop Heat Pipes, May 19, 2002.

PCT/US2020/014754 Patent Cooperation Treaty International Search Report and Written Opinion of the International Searching Authority, dated Apr. 7, 2020.

\* cited by examiner

CONDUCTIVE COOLING FOR SMALL FORM-FACTOR PLUGGABLE (SFP) FIBER OPTIC TRANSCEIVERS

TECHNICAL FIELD

The present disclosure relates generally to network switches and, more particularly, to a conductive cooling assembly for a small form-factor pluggable (SFP) transceiver of a network switch.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

Figure 1:
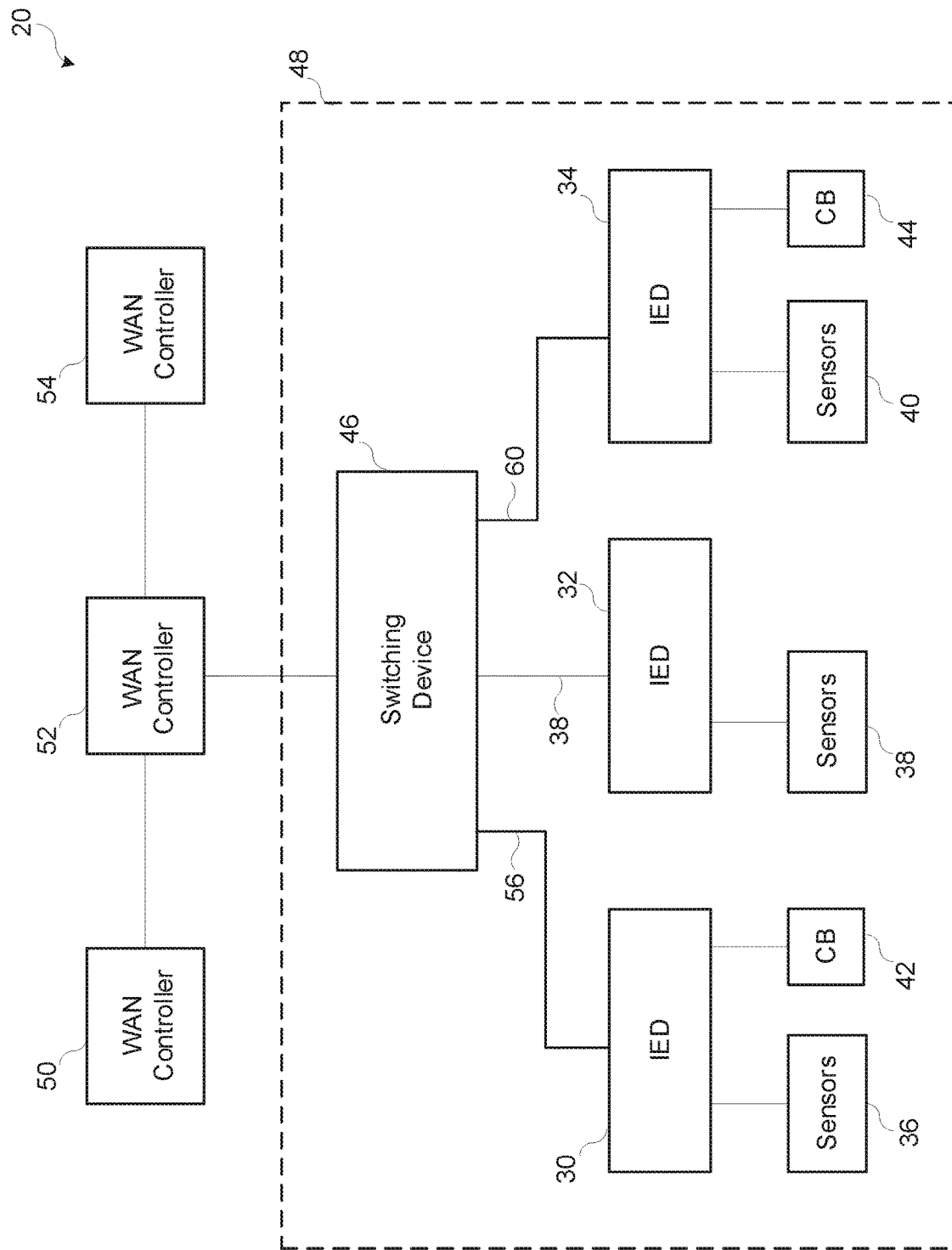
FIG. 1 is a block diagram of a network of electronic devices that use a switch to communicate with each other to monitor and/or protect an electric power delivery system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems may include equipment, such as generators, power lines, transformers, and the like, to provide electrical energy from a source to one or more loads. Electric power delivery systems may include various electronic devices that are used to monitor, control, and protect the equipment in electric power delivery systems. Further, communication networks may be used to allow the electronic devices to communicate data to better monitor, control, and protect these electric power delivery systems. For example, network switches may be used to connect intelligent electronic devices (IEDs) on a network to allow the IEDs to communicate with each other and/or to communicate with devices outside of the network, such as central monitoring stations. These switches may receive data from a sending electronic device and forward the data towards a destination device.

Switches may be connected to the devices in the network in various ways. One way is to connect a fiber optic cable from the device to the switch. To convert the optical signals received over the fiber optic cable into electrical signals used by the switch to forward the data (and vice versa), the switch may include a small form-factor pluggable (SFP) transceiver that performs these conversions. For instance, the SFP transceiver may be plugged into the switch and receive optical signals from a monitoring device in an electrical power delivery system. The SFP transceiver may convert these optical signals into electrical signals to provide the communicated data to the switch for forwarding by the switch.

During operation, the SFP transceiver may produce heat due to receiving, converting, and sending optical and electrical signals. Further, the SFP transceiver may have designed operating temperatures in which the SFP transceiver is designed to withstand. To maintain operation of the SFP transceiver within these designed operating temperatures, fans or complex designs may be used to cool the SFP transceiver. However, fans and complex designs may be costly and inefficient. Accordingly, there is a need to improve cooling of SFP transceivers to operate at the designed temperatures.

As explained below, in some embodiments, a switch may include an SFP transceiver assembly that conductively cools the SFP transceiver. For example, the SFP transceiver assembly may include a cooling block and a thermally conductive pad made of a thermally conductive material coupled to the cooling block. The SFP transceiver assembly may include a spring finger that contacts the thermally conductive pad while an SFP transceiver is inserted into the SFP transceiver assembly to allow heat to be conducted from the SFP transceiver to the cooling block via the thermally conductive pad to conductively cool the SFP transceiver. The spring finger may rotate (e.g., bend) from a disengaged position in which the spring finger guides insertion of the SFP transceiver to an engaged position in which the spring finger contacts the thermally conductive pad.

FIG. 1 illustrates a block diagram of an embodiment of a communication network 20 for various electronic devices that are used to monitor, control, and/or protect an electric power delivery system. Intelligent electronic devices (IEDs) 30, 32, and 34 may include sensors 36, 38, and 40 to monitor equipment of the electric power delivery system, such as electric transmission lines, electric distribution lines, current transformers, buses, switches, circuit breakers, reclosers, transformers, autotransformers, tap changers, voltage regulators, capacitor banks, generators, motors, pumps, compressors, valves, and a variety of other types of monitored equipment.

As used herein, the IEDs 30, 32, and 34 may refer to any microprocessor-based device that monitors, controls, automates, and/or protects monitored equipment within the electric power delivery system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

Further, IEDs 30 and 34 may include circuit breakers 42 and 44 to electrically disconnect portions of the electric power delivery system to protect the electric power delivery system. For instance, the IED 30 may be embodied as a relay and may send a signal to the circuit breaker 42 to electrically disconnect a portion of the electric power delivery system based on an indication that an overcurrent event, undercurrent event, overvoltage event, undervoltage event, underfrequency event, or overfrequency event has occurred in the electric power delivery system.

The communication network 20 may include a switching device 46 that receives data from each of the IEDs 30, 32, and 34, processes the data and forwards the data to the destination device. For example, IED 30 may send a signal to the IED 34 via the switching device indicating that an event has occurred. The IED 34 may then trip the circuit breaker 44 based on the event that has occurred. In the illustrated embodiment, the IEDs 30, 32, and 34 and the switching device 46 may be located at a substation 48 of the electric power delivery system. The switch 46 may be communicatively coupled to a wide area network (WAN) controller, which may allow the IEDs 30, 32, and 34 to communicate with other substations via the WAN controllers 50, 52, and 54 and/or a central monitoring station. The IEDs 30, 32, and 34 may be communicatively coupled to the switch 46 with fiber optic cables 56, 58, and 60. The switch 46 may be designed to communicate electrical signals between various devices. As mentioned above, an SFP transceiver may be inserted into an SFP transceiver assembly of the switch 46 to convert the optical signals into electrical signals to communicate with the switch 46 and vice versa.

Figure 2:
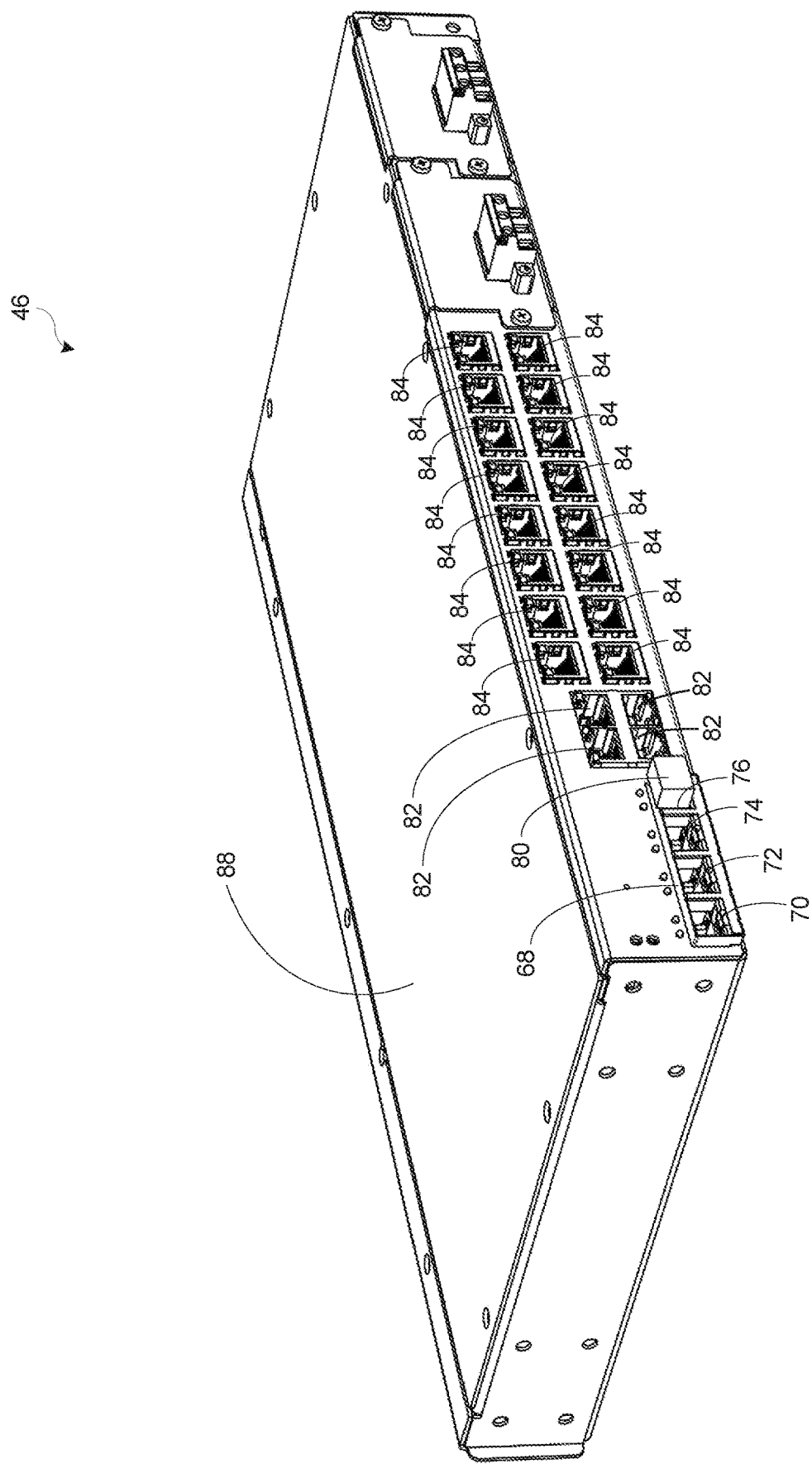
FIG. 2 is a perspective view of the switch of FIG. 1 having a small form-factor pluggable (SFP) conductive cooling assembly, in accordance with an embodiment.

FIG. 2 is a perspective view of the switch 46 having an SFP transceiver assembly 68. The SFP transceiver assembly 68 may include ports 70, 72, 74, and 76 that may be used to communicatively couple the switch 46 to electronic devices, such as the IEDs 30, 32, and 34, for example, with a fiber optic communication media via an SFP fiber optic transceiver 80. The SFP transceiver 80 may be inserted into one of the ports 70, 72, 74, 76 of the SFP transceiver assembly 68. The SFP transceiver 80 may convert electrical signals from the switch 46 into optical signals to send via the fiber optic cables 56, 58, and 60. Further, the SFP transceiver 80 may convert optical signals received from the IEDs 30, 32, and 34 into electrical signals and send the electrical signals to the switch 46. The switch 46 may include other ports 82 and 84 that may also couple the electronic devices via communication media, such as ethernet cables. The switch 46 has a chassis 88 that houses switching circuitry and hardware that receives data from the ports 70, 72, 74, 76, 82, and 84 and forwards the data towards destination devices via the ports 70, 72, 74, 76, 82 and 84.

As mentioned above, the SFP fiber optic transceiver 80 may be designed to operate within predefined operating temperatures. As described below, by using thermally conductive materials to transfer heat away from (e.g., cool) the transceiver to maintain temperatures of the SFP transceiver 80 within the predefined operating temperatures, the SFP transceiver assembly 68 may conductively cool the SFP transceiver 80.

Figure 3:
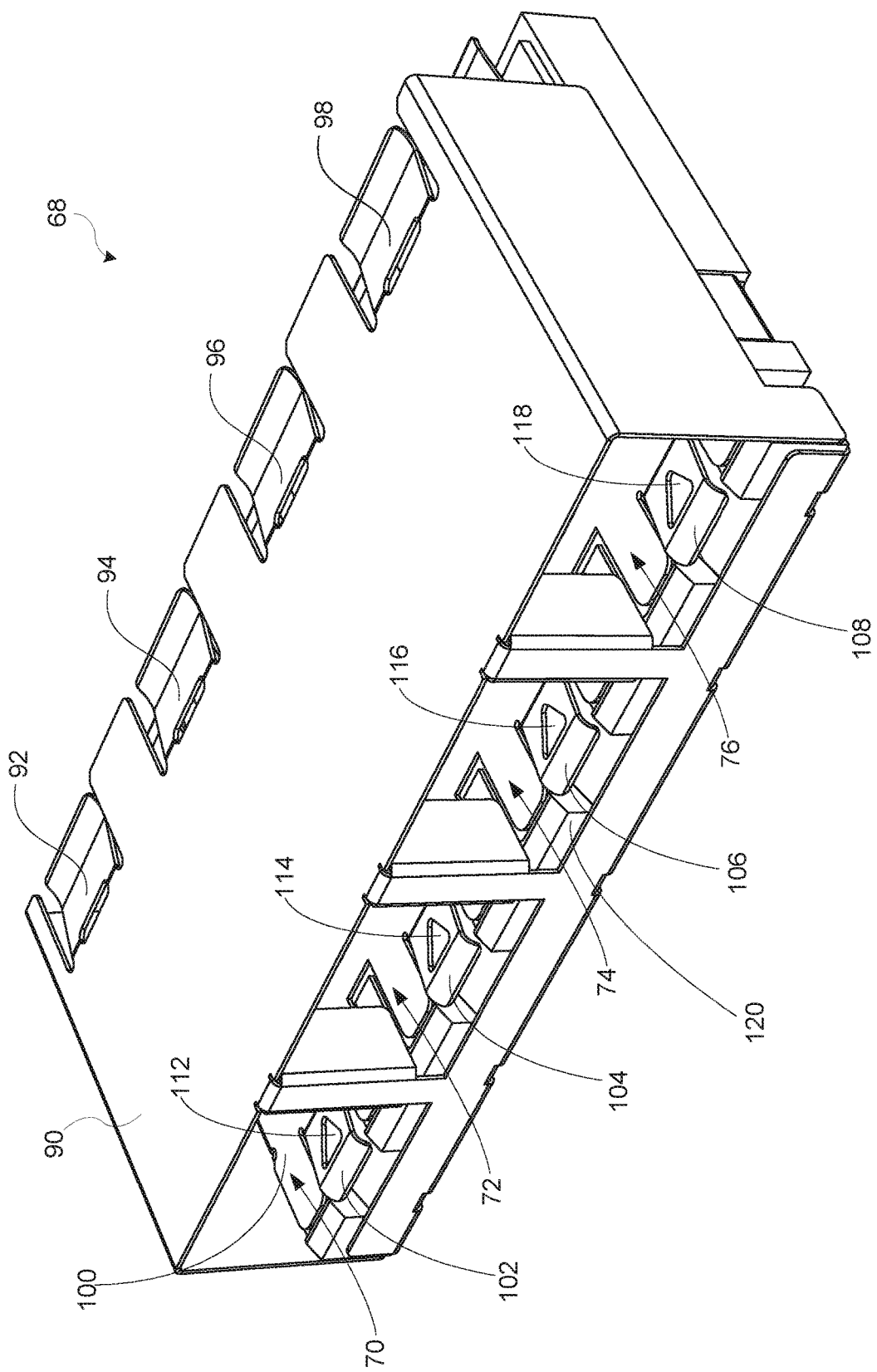
FIG. 3 is a perspective view of the SFP conductive cooling assembly of FIG. 2, in accordance with an embodiment.

FIG. 3 is a perspective view of the SFP transceiver assembly 68 of the switch 46 that conductively cools SFP transceivers. The SFP transceiver assembly includes a housing, which is also referred to as an SFP cage 90. While illustrated as having four ports 70, 72, 74, and 76, the SFP cage 90 may be scaled to conform to any number of SFP ports. The SFP cage 90 may secure the components of the SFP transceiver assembly 68 together. The SFP cage 90 includes spring fingers 92, 94, 96, and 98 that align and ensure correct insertion of the SFP transceiver 80 to connect the SFP transceiver to an electrical connector of switching circuitry in the switch 46, as described below.

In the illustrated embodiment, the SFP transceiver assembly 68 includes an SFP latch and spring finger body 100 that includes latches 102, 104, 106, and 108 with respective openings 112, 114, 116, and 118 to secure the SFP transceiver 80 in the SFP cage 90, for example, during vibration events. For instance, the openings 112, 114, 116, and 118 may engage with a corresponding protrusion of an SFP transceiver 80 to secure the SFP transceiver 80 while inserted in the SFP cage 90.

Figure 4:
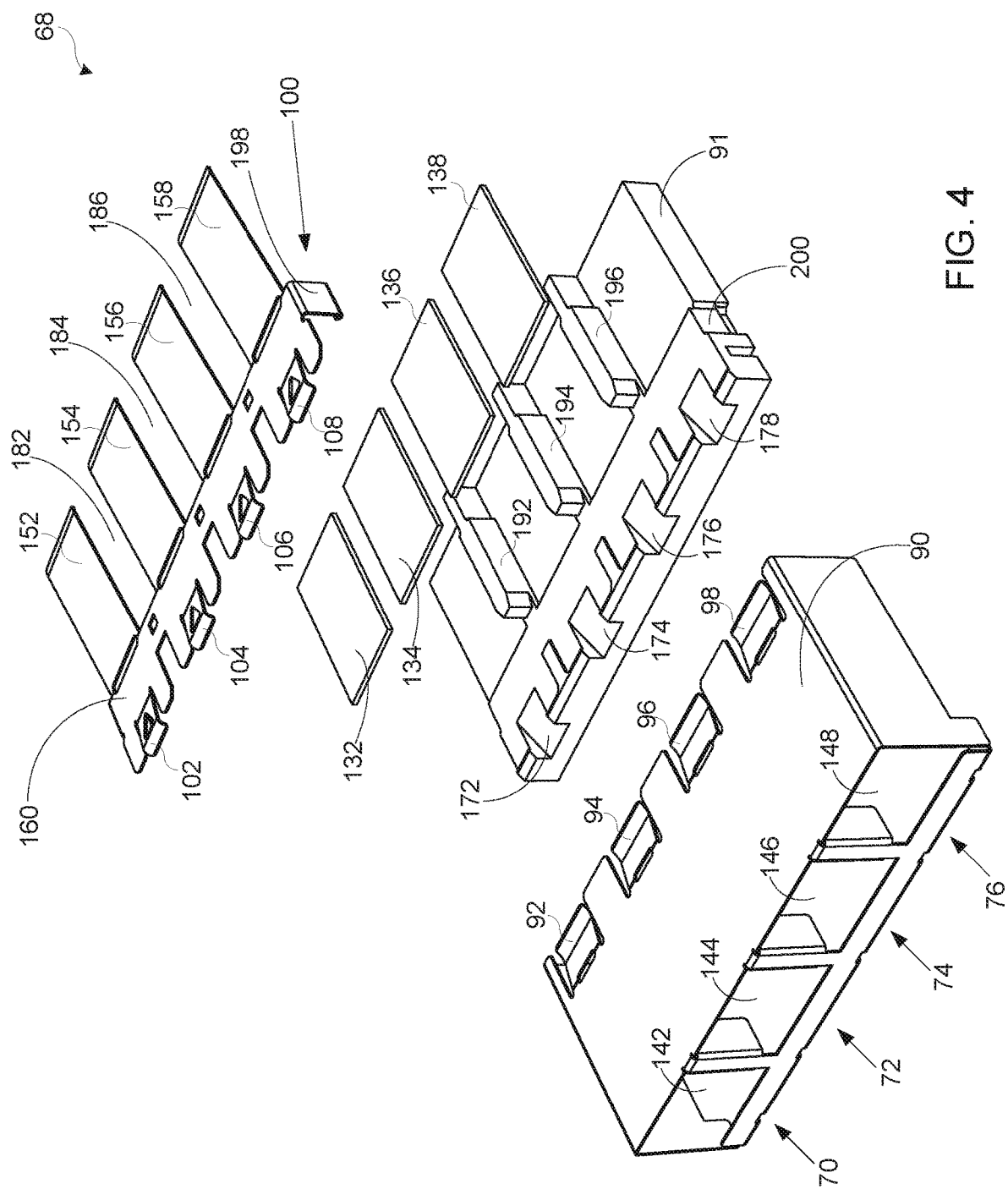
FIG. 4 is an exploded view of the SFP conductive cooling assembly of FIG. 2, in accordance with an embodiment.

FIG. 4 is an exploded perspective view of the SFP transceiver assembly 68, in accordance with an embodiment. The SFP transceiver assembly 68 includes the SFP latch and spring finger body 100, the SFP cage 90, the conductive cooling block 91, and thermally conductive pads 132, 134, 136, and 138. The SFP cage 90 may form openings 142, 144, 146, and 148 to allow insertion of the SFP transceiver 80 into the fiber optic port 70, 72, 74, and 76.

The SFP latch and spring finger body 100 may include spring fingers 152, 154, 156, and 158 that rotate (e.g., compress or bend) with respect to a base 160 of the SFP latch and spring finger body 100 to move from a disengaged position to an engaged position. In the engaged position, the spring finger 152, 154, 156, and 158 may rotate into contact with the respective thermally conductive pad 132, 134, 136, and 138 to form a thermally conductive path from the SFP transceiver 80, through the SFP spring finger 152, 154, 156, and 158 and the thermally conductive pad 132, 134, 136, and 138 to the conductive cooling block 91 to allow for conductive cooling of the SFP transceiver 80. For example, the spring finger 152, 154, 156, and 158 may be compressed into the respective thermally conductive pad 132, 134, 136, and 138 to allow heat to transfer conductively from the SFP transceiver 80.

The thermally conductive pads 132, 134, 136, and 138 may be coupled to the cooling block 91 via an adhesive, a press-fit connection, or any other suitable method. The thermally conductive pads 132, 134, 136, and 138 may be made of thermally conductive (e.g., silicon-based) material that is sufficiently flexible (e.g., compressible) to account for tolerances in the SFP transceiver assembly 68, such as machine tolerances of the cooling block 91, the spring finger 152, 154, 156, and 158, the SFP transceiver 80, or any combination thereof. By using a compressible material, the thermally conductive pads 132, 134, 136, and 138 may ensure bridging of thermal conductivity between the spring finger 152, 154, 156, and 158 and the cooling block 91 without air gaps that would reduce the thermal conduction. Further, the spring finger 152, 154, 156, and 158 and the cooling block 91 may be made of metal or another thermally conductive material to form a thermally conductive path away from the SFP transceiver 80.

In the disengaged position, the spring finger 152, 154, 156, and 158 may guide insertion of the SFP transceiver 80 while the SFP transceiver 80 is inserted. For example, the ramped state of the spring finger 152, 154, 156, and 158 may facilitate smooth insertion of the SFP transceiver 80. Further, the spring finger 152, 154, 156, and 158 may be biased towards the SFP transceiver 80 to ensure sufficient contact with the SFP transceiver 80 to conduct heat from the SFP transceiver 80.

The latch and spring finger body 100 may be contoured to fit the cooling block 91 and the thermally conductive pads 132, 134, 136, and 138. For example, the cooling block 91 includes ramped surfaces 172, 174, 176, and 178 to allow for flexing of the latch 102, 104, 106, and 108 when the SFP transceiver 80 is engaged. Further, the latch and spring finger body 100 may include openings 182, 184, and 186 between the spring fingers 152, 154, 156, and 158 to allow for protrusions 192, 194, and 196 between the spring fingers 152, 154, 156, and 158. Because the spring fingers 152, 154, 156, and 158 are separated by the openings 182, 184, and 186, the spring fingers 152, 154, 156, and 158 may move between the engaged and disengaged positions independently of each other. Further, the body 160 may include fasteners 198 that press-fit into corresponding features 200 of the cooling block 91 to secure the body 100 with respect to the cooling block 91.

Figure 5:
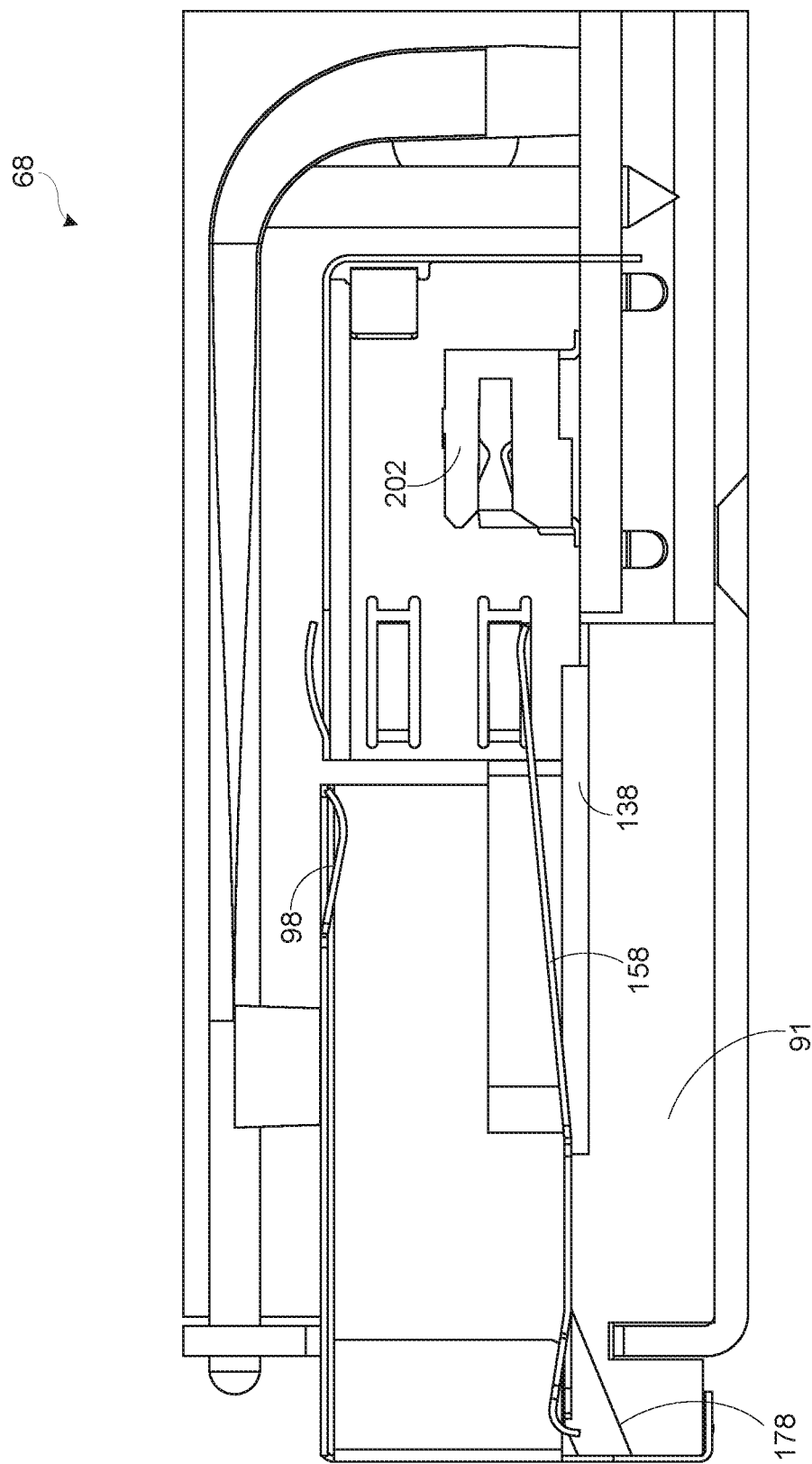
FIG. 5 is a cross sectional view of the SFP conductive cooling assembly without an SFP transceiver inserted, in accordance with an embodiment.

FIG. 5 is a cross-sectional view of the SFP transceiver assembly 68 with the spring finger 158 in a disengaged position. The SFP transceiver assembly 68 includes an electrical connector 202 that electrically connects the SFP transceiver 80 to the switching circuitry (e.g., a printed circuit board (PCB)) of the switch 46. In the disengaged position, the spring finger 158 forms a lower ramped surface and the spring finger 98 forms an upper ramped surface to guide the SFP transceiver 80 into the electrical connector 202 during insertion. Further, the spring finger 158 may have a ramped surface that allows for a sliding insertion of the SFP transceiver 80 that also ensures that a thermally conductive path is formed.

Figure 6:
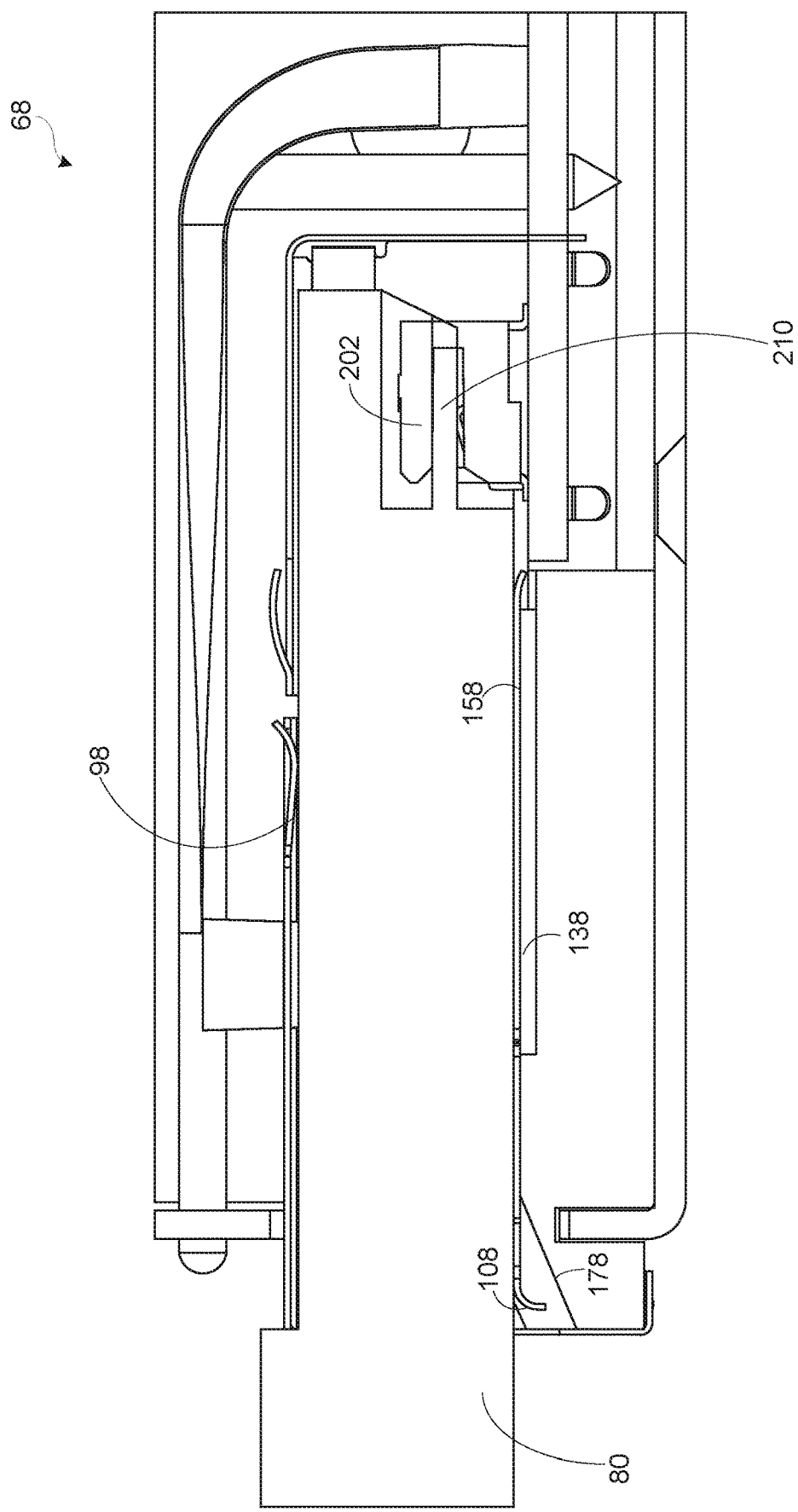
FIG. 6 is a cross sectional view of the SFP conductive cooling assembly with the SFP transceiver inserted, in accordance with an embodiment.

FIG. 6 is a cross-sectional view of the SFP transceiver assembly 68 with the spring finger 158 in an engaged position due to insertion of the SFP transceiver 80. The spring finger 158 rotates (e.g., bends) to the engaged position during insertion of the SFP transceiver 80, and the spring finger 98 bends due to contact from the SFP transceiver 80 to guide insertion of a male electrical connector 210 of the SFP transceiver 80 within the female electrical connector 202 of the SFP transceiver assembly 68. The male electrical connector 210 and the female electrical connector 202 communicatively couple the SFP transceiver 80 with the switch 46 to allow the SFP transceiver 80 to provide electrical signals to the switch 46 based on optical signals received via a fiber optic connection and to send optical signals via the fiber optic connection based on electrical signals received from the switch 46.

The spring finger 158 may be rotated to a position parallel with the thermally conductive pad 138 to cause greater surface area contact with the thermally conductive pad 138 than while in the disengaged position to improve the thermal conductivity between the spring finger 158 and the thermally conductive pad 138. The thermally conductive pad 138 may be compressed from contact with the spring finger 158 to create a solid conduction path from the SFP transceiver 80 through the spring finger 158, the thermally conductive pad 138, and the conductive cooling block 91. As the SFP transceiver 80 generates heat, the heat may move through the spring finger 158, the thermally conductive pad 138, and the conductive cooling block 91 and into the chassis 88.

The latch 108 may rotate (e.g., bend) into a space formed due to the ramped surfaces 178. The latch 108 may be pushed downward to disengage a corresponding protrusion of the SFP transceiver 80 to remove the SFP transceiver 80. The thermally conductive pad 138 may be flexibly compressed and decompressed due to insertion/removal of the SFP transceiver 80.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A small form-factor pluggable (SFP) transceiver assembly, comprising:
   a cooling block;
   a thermally conductive pad comprising a thermally conductive material;
   a spring finger body comprising a spring finger, wherein the spring finger body is configured to couple to a cooling block with the thermally conductive pad therebetween, wherein the spring finger is configured to contact the thermally conductive pad while an SFP transceiver is inserted into the SFP transceiver assembly to allow heat to be conducted from the SFP transceiver to the cooling block, via the thermally conductive pad and the spring finger, to conductively cool the SFP transceiver, wherein the spring finger is configured to rotate between an engaged position in which the spring finger contacts the thermally conductive pad to allow the heat to be conducted from the SFP transceiver, through the spring finger, and to the thermally conductive pad and a disengaged position in which the spring finger guides the insertion of the SFP transceiver; and
   an SFP cage configured to house the spring finger, the cooling block, and the thermally conductive pad, wherein the SFP cage comprises at least one opening configured to receive the SFP transceiver;
   wherein the cooling block is contoured with a recess to receive the thermally conductive pad to maintain the position of the thermally conductive pad.

2. The SFP transceiver assembly of claim 1, wherein the spring finger is configured rotate to a position parallel to the thermally conductive pad while in the engaged position to increase surface contact between the thermally conductive pad and the spring finger.

3. The SFP transceiver assembly of claim 1, wherein the thermally conductive material is compressible to allow for tolerances in the spring finger, the SFP transceiver, the cooling block, or any combination thereof, and wherein the spring finger is configured to compress the thermally conductive material in the engaged position.

4. The SFP transceiver assembly of claim 3, wherein the thermally conductive material comprises a silicon-based material.

5. The SFP transceiver assembly of claim 1, wherein the cooling block and the spring finger are made of metal to conduct heat from the SFP transceiver while the SFP transceiver is inserted.

6. The SFP transceiver assembly of claim 1, wherein the spring finger is configured to bend with respect to the spring finger body to allow the spring finger to rotate between an engaged position and a disengaged position.

7. The SFP transceiver assembly of claim 6, wherein the spring finger body comprises a latch having an opening configured to engage a corresponding protrusion of the SFP transceiver.

8. The SFP transceiver assembly of claim 6, wherein the spring finger body comprises a fastener configured to secure the spring finger body to the cooling block.

9. A switch, comprising:
  switching circuitry configured to receive data from a sending device and to forward the data to a destination device; and
  an SFP transceiver assembly, comprising:
    a cooling block;
    a thermally conductive pad comprising a thermally conductive material;
    a latch and spring finger body comprising a first spring finger, wherein the spring finger body is configured to be coupled to a cooling block with the thermally conductive pad therebetween, wherein the first spring finger is configured to contact the thermally conductive pad while an SFP transceiver is inserted into the SFP transceiver assembly to allow heat to be conducted from the SFP transceiver to the cooling block, via the thermally conductive pad and the first spring finger, to conductively cool the SFP transceiver;
    an SFP cage configured to house the first spring finger, the cooling block, and the thermally conductive pad, wherein the SFP cage comprises at least one opening configured to receive the SFP transceiver;
    an electrical connector configured to communicatively connect the SFP transceiver to the switching circuitry; and
    a housing comprising a second spring finger having a ramped surface opposite of a ramped surface of the first spring finger, wherein the ramped surface of the second spring finger and the ramped surface of the first spring finger are configured to guide the SFP transceiver to connect with the electrical connector;
    wherein the cooling block is contoured with a recess to receive the thermally conductive pad to maintain the position of the thermally conductive pad.

10. The switch of claim 9, wherein the electrical connector comprises a female connector configured to receive a male connector of the SFP transceiver.

11. The switch of claim 9, wherein the SFP transceiver assembly comprises a plurality of openings, wherein the plurality of openings are each configured to engage a corresponding SFP transceiver.

12. The switch of claim 9, the latch and spring finger body comprises the first spring finger and a third spring finger, wherein the latch and spring finger body comprises a gap between the first spring finger and the second spring finger to allow the first spring finger to move independent of the second spring finger.

13. A method, comprising:
  coupling a thermally conductive pad to a cooling block of a small form-factor pluggable (SFP) transceiver assembly, wherein the cooling block is contoured with a recess to receive the thermally conductive pad to maintain the position of the thermally conductive pad;
  movably coupling a spring finger of a latch and spring finger body to the cooling block such that the spring finger is configured to contact the thermally conductive pad while an SFP transceiver is inserted into the SFP transceiver assembly to allow heat to be conducted from the SFP transceiver to the cooling block, via contact with the thermally conductive pad and the spring finger, to conductively cool the SFP transceiver, wherein the latch and spring finger body is configured to bend to allow the spring finger to rotate between an engaged position and a disengaged position; and
  housing the first spring finger, the cooling block, and the thermally conductive pad within an SFP cage, wherein the SFP cage comprises at least one opening configured to receive the SFP transceiver.

14. The method of claim 13, comprising inserting the SFP transceiver assembly into a chassis of a switch.

15. The method of claim 13, comprising coupling the thermally conductive pad with the cooling block via an adhesive to secure the thermally conductive pad in place.

16. The method of claim 13, comprising fastening a latch and spring finger body to the cooling block via a fastener.

* * * * *